United States Patent Office 3,417,181
Patented Dec. 17, 1968

3,417,181
METHOD FOR DISPERSING TOXICANTS TO KILL DISEASE-SPREADING WATER-SPAWNED LARVA, TREMATODES, MOLLUSKS AND SIMILAR ORGANISMS, AND PRODUCTS USED IN SUCH METHOD
Nathan F. Cardarelli, Copley, Ohio, assignor to The B. F. Goodrich Company, New York, N.Y., a corporation of New York
No Drawing. Continuation-in-part of application Ser. No. 528,785, Feb. 21, 1966. This application Feb. 15, 1967, Ser. No. 616,187
5 Claims. (Cl. 424—229)

ABSTRACT OF THE DISCLOSURE

To kill water-spawned or water-carried disease-transmitting organisms such as mosquitos, midges, black flies, schistosome cercariae and their snail hosts, other gastropods and insect pests, all without rendering the water toxic to humans, animals and fish, a toxicant such as the organotin compounds and alkanolamine salts of salicyl anilides is dissolved into a vulcanizable elastomeric matrix and the resulting vulcanized or vulcanizable toxicant composition is immersed in the pest-ridden water. The toxicant content of such composition in vulcanized form is released slowly and at a controlled rate such that toxicant content in the water is maintained for a greatly extended period of many months and even years at a level fatal to pests but not to humans, animals and fish. Neoprene is a preferred elastomer and nitrile, butyl, and styrene-butadiene rubbers may also be employed. The vulcanized toxicant composition can be dispersed in either stagnant or running water in the form of pellets, pieces, chunks, tapes, or sheets, etc., as is most convenient.

Cross-reference to related applications

This application is a continuation-in-part of applicant's U.S. Ser. No. 528,785, filed Feb. 21, 1966 (now abandoned), claiming a larvicidal elastomer-organotin composition which is useful in the form of pellets or strips for poisoning mosquito and fly larva and schistosomes in the water in which these organisms are spawned.

Another related background application in U.S. Ser. No. 515,154 by Nathan F. Cardarelli and Harry F. Neff, filed Dec. 20, 1965, claiming organotin compositions useful as marine coverings to resist fouling by marine genera like barnacles, algae, etc.

Background of the invention

This invention relates to toxicants and the dissemination of them in controlling disease-spreading water-spawned organisms. The invention is useful to the public health authorities in killing larva of mosquitoes, flies, midges, and aquatic snails and their trematode parasites, etc. responsible for transmitting malaria, yellow fever, dengue fever, schistosomiasis and related diseases.

Prior to this invention, aquatic larva have been destroyed either by poisoning the water breeding areas, or by covering such water with oily materials which fatally damage the respiratory or other physiological processes of the organism. Both these basic techniques are generally effective but have well-recognized limitations.

Conventional larvicides or insecticides such as DDT, the organo-phosphates, arsenic, etc. are very dangerous to store and to distribute, and they must be used with great care to avoid excessively poisoning water, i.e., poisoning it to the extent it would be unfit and dangerous for use by humans, cattle, fish and the other desirable marine and bird life. Oils used for this purpose practically always destroy the utility of a pond or water course for livestock and other animals and marine life and therefore can be used to only a very limited extent.

In either case the period in which such treatments are effective are quite limited, even in stagnant water. Ordinary larvicides sprayed into stagnant water in recommended concentrations may be effective for about six to eight weeks. Their effectiveness is much shorter for slowly flowing waters such as the water of typical irrigation ditches. Oiling a pond may be effective for a period of three to six months.

The preferred toxicants used in the elastomeric compositions discussed in this application have been recognized in the prior art as being toxic to certain water-spawned organisms. Organotin compounds have been used in antifouling paints (cf. British patent specification 1,001,369) and salts of 2',5-dichloro-4'-nitrosalicylanilide have been proposed for killing snails (cf. U.S. 3,079,297 and U.S. 3,113,067).

Description of invention

According to this invention a biocidal rubber composition is provided which is particularly effective for the larva noted as well as many other insect pests but which is *not harmful* to other animal life in the concentrations suitable for killing larva, and which provides an unusually long term larvicidal action as compared with the prior art techniques.

When using organotin toxicants as the toxic compounding agent for these elastomer compositions, the long term toxic action is provided by a presently unidentified substance (but believed to be a type of organotin compound) which is only slightly soluble in water but which is highly soluble in the vulcanizable elastomer matrices. The active toxic agent in the elastomeric composition dissolves steadily and progressively but very slowly from the surface when the composition is immersed in larva-spawning water. Essentially the same slow release effect occurs with toxic compounding agents in the elastomer such as the alkanolamine salts of salicyl anilides. The toxicant eventually dissolved into the infested water from the resulting elastomer compositions including the latter salts have not been positively identified but are believed to be very similar if not identical to the starting toxic salts.

These biocidal rubber compositions are preferably in vulcanized form for use. They may be prepared in a wide variety of shapes and forms depending on the service required. One preferred form is in chunks, pellets, strips or very long tapes. The pellets, for example, may be considerably smaller in size and weight than a kernel of corn. These compositions may be molded also into any configuration or article in accordance with conventional techniques in the rubber manufacturing art. In whatever the form, these compositions are relatively safe and non-toxic to humans and higher animal forms while they are in storage or in shipment to the site of use and they remain stable and effective for indefinite periods of storage. To distribute these biocides for use, the elastomer compositions are merely dropped into the pond or other body of water. They do not require any special distribution in the water. After immersion the water progressively dissolves the toxic agent from the surface of the elastomer which in turn poisons the larva.

Although the chemical identity of the toxic agent or agents actually dissolving from the vulcanized elastomeric biocidal compositions of this invention is not precisely known, we do know that with compositions prepared with organotin or with the alkanolamine salts, the active toxic agent dissolving from the composition has a very slight solubility in water but even in extremely small amounts these toxic agents are highly effective in killing the objectionable larva noted. Because of this very low solubility, however, it appears imposible to build up a toxic concentration to a point where it is harmful or dangerous to fish, cattle and other animals. Therefore, a body of water treated with these biocides remains as useful as it ever was for regular agricultural uses.

One class of preferred toxicants for these biocidal elastomeric compounds are organotins. The elastomers are specially selected so that the organotins are soluble in them and we have found that there are a number of elastomers which can be suitably compounded with these organotins.

Unvulcanized elastomeric compounds including an organotin toxic agent are effective for this purpose, but we have been surprised to find that the vulcanized form of these same compositions is considerably more effective than the unvulcanized form. This conclusion is based on studies we have made of the time required to kill a given number of mosquito larva in equal volumes of water with equal weights of the same elastomeric composition in both its vulcanized and unvulcanized state. This phenomenon leads us to conclude that the toxic agent dissolved by the water from a vulcanized composition differs chemically from the particular organotin compounding agent originally dissolved in the rubber, the transformation somehow being linked to the vulcanization process in a manner we have been unable to identify at the present time. A similar effect may occur in biocidal rubber compositions embodying the alkanolamine salts.

The long-term larvicidal action provided by these biocidal rubber compositions appears to result from the physical mechanism of solubility equilibrium. For this reason it is important to select or prepare the elastomeric base so that the toxicant agent is in fact soluble in it. According to the theory of solubility equilibrium, the water in contact with the elastomeric composition progressively dissolves the toxic molecules at the rubber-water interface, unbalancing the equilibrium of the molecular dispersion of the toxic throughout the interior of the elastomeric composition and thereby causing a migration of additional toxic molecules to the surface or water-interface to reestablish equilibrium solubility. This process continues until the toxic agent is substantially depleted. On the other hand, because of their very low solubility in water, the toxic agents cannot be depleted from the elastomeric composition at a rate greater than its diffusion-dissolution rate. We have found that in a given body of infested water reasonable amounts of these elastomeric compositions can provide biocidal protection for a period of several years, as against a period measured in days or weeks when the same toxicants are directly dispersed in the water in accordance with the prior art techniques. Cold freezing weather itself will kill larva but low temperatures in themselves have no effect on the efficiency of these compositions to provide the desired biocidal action whenever warm weather does return.

These biocidal rubber compositions may be made and sold at reasonable prices, and are easy and simple to use by even the most unskilled and uninformed person. Even if excessive quantities of the rubber compounds are accidentally placed in a given water course, it is still not possible to poison the water to a dangerous level to anything except the larva in question because of the low solubility. The only possible hazard involved is for a person or animal to eat the elastomer composition itself which is quite unappetizing. Moreover, the user is not required to undertake any mixing activity himself. These compositions, therefore, are of extraordinary value in primitive or "under developed" areas where the protection needed is high and the technical abilities of the users may be limited.

The particular elastomers useful in the practice of this invention are rubbers selected from the class consisting of neoprene (polychloroprene); butyl (isobutylene isoprene copolymer); SBR (styrene-butadiene polymers); CB (cis-polybutadiene); EPO (ethylene-propylene rubber); polyether and polyester urethanes; nitriles (butadiene-acrylonitrile polymers and terpolymers) with acrylonitrile content less than 35%; EPT (ethylene-propylene terpolymer); natural rubber; hydrins (epichlorohydrin rubber); and the silicone rubbers. Particularly useful are elastomers which are vulcanizable or readily cross-linked as with sulfur, sulfur-containing compounds, metal oxides, peroxides, amines and the like.

One preferred class of toxicants used as compounding ingredients in the foregoing elastomers are organo-metallic compounds which are (a) toxic to larva of mosquitoes, midges, schistosome cercariae and other organisms noted; (b) soluble in the elactomers; and (c) at least slightly soluble in water. Typical organo-metallic compounds useful for this purpose are soluble in water less than 50 parts per million. Typical compounds are organotin compounds of formula $R_3SnX$, wherein R is an alkyl or phenyl group. Particularly useful are compounds wherein the alkyl groups contain 3 to 4 carbon atoms. The alkyl or phenyl group usually contains 8 or less carbon atoms. X is one of the following radicals: sulphide, oxide, chloride, fluoride, bromide, chromate, sulphate, nitrate, hydroxide, acetate, laurate, resinate, dimethyl dithiocarbamate, naphthenate, paravinylbenzoate, acrylate, methyacrylate, isooctylmercapto-acetate, hydride or methoxide. The preferred R group is the N-butyl group. Preferably X is oxygen, sulfur or a halogen. A preferred compound of this class is bis(tri-n-butyltin) oxide. Another highly effective compound is bis(tri-n-butyltin) sulfide.

Typical examples of other compounds of the formula $R_3SnX$ which may be used are bis(tri-n-propyltin) oxide, tri-n-propyltin chloride, triisopropyltin chloride, triamyltinoxide, triisobutyltin chloride, tributyltin acetate, tributyltin chloride, triphenyltin chloride, tributyltin laurate, tributyltin fluoride, tributyltin chromate, tributyltin maleate, amyl diethyltin chloride, butyl dipropyltin chloride, tributyltin hydride, tributyltin resinate, tributyltin isooctylmercaptoacetate, tributyltin dimethyl dithiocarbamate, tributyltin nonanoate, tributyltin naphthenate, hexabutyltin poly(tributyltin) paravinylbenzoate and poly(tributyltin) methacrylate.

Another preferred class of toxicants which may be substituted for the foregoing organotins are alkanolamine salts of salicyl anilides, the detailed description of which may be found in U.S. Patent 3,113,067 and U.S. Patent 3,079,297. One particular toxicant of this class, known commercially as Bayluscide (a product now offered for sale by Chemagro Corporation, Kansas City, Mo.) is 2-aminoethanol salt of 2',5-dichloro-4'-nitrosalicylanilide. Bayluscide and its related materials have a solubility limit in water of less than 500 parts per million.

In the preparation of these biocidal rubber compositions, the concentration of the toxic additives may vary between 0.02 part per hundred parts of the elastomer (p.p.hr.) to about 20 parts per hundred parts of the elastomer, depending upon the respective solubility of the toxicant in the elastomer. The preferred concentration is the maximum quantity which is capable of dissolving in the elastomer, although quantities in excess of this may be used effectively inasmuch as the effect of the additive on the physical properties of the elastomer for this purpose is usually of no importance.

Basic or conventional rubber compounding techniques and equipment are used in the preparation, and no special manufacturing precautions or equipment is required. Some of the most effective toxic additives are in the form of powders which are dispersed into the elastomer like other dry compounding ingredients. Other of these toxic additives are in the form of oils as they are presently commercially available and these oils also provide some measure of processing assistance in the compounding operations. It is, of course, possible to add at least the organotin compounds to some elastomers in the polymerization stage of the manufacture of the elastomer if desired. And the toxic compounds may be also added to liquid solutions of the elastomer.

The resulting biocidal elastomer compounds may be further processed with conventional rubber machinery and techniques in that the compounds may be extruded, rolled, molded into the forms and shapes desired, or calendered onto fabrics. They may be vulcanized also according to conventional techniques at pressures and temperatures characteristic of the vulcanizing agents and the particular elastomer selected. They may be specifically compounded for room-temperature curing if desired.

One of the most convenient forms for using these compositions is in pellets or chunks which may be scattered at random into a farm pond, ditch, sewer, septic outcrop, swamp or other water bodies. The actual distribution of the pellets or chunks is unimportant since the effectiveness depends on solubility phenomena in the water. Another convenient form is to make these compositions into long strips or tapes and lay them in irrigation ditches. This is quite useful where there is slight current or movement in the water. Insect larva ordinarily are not a serious problem in rapidly flowing water but schistosome cercariae and their snail hosts do live in flowing water.

For protecting drinking water when carried in water bags or canteens, these compositions may be calendered directly on fabric from which the water bags are made, or they may be molded into canteens or used directly in canteens. In any case, these compositions will be toxic to flukes and many other organisms in the water harmful to humans, but the compositions themselves are apparently not harmful to humans or materially affect the taste of such water. Obviously any composition touching any food, water or other material for human consumption, must in all other respects be non-toxic to humans.

Specific examples of typical compositions made in accordance with this invention (but not necessarily suitable for contact with human food) are:

(1) SBR (STYRENE BUTADIENE RX)

| Ingredient | Parts per hundred parts of rubber (p.p.hr.) | | | | |
|---|---|---|---|---|---|
| | 1 | 2 | 3 | 4 | 5 |
| Styrene butadiene [1] | 100 | 100 | 100 | 100 | 100 |
| Zinc oxide | 5 | 5 | 5 | 5 | 5 |
| Sulfur | 2 | 2 | 2 | 2 | 2 |
| Benzothiazyl disulfide | 1.75 | 3 | 1.75 | 3 | 2.75 |
| Stearic acid | | 1.5 | 1.5 | | 1.5 |
| Channel black | 40 | 40 | 40 | 40 | 40 |
| Tributyltin oxide | 0.02–10 | 0.02–10 | 0.02–10 | 0.02–10 | 0.02–10 |

[1] NBS Reference rubber 387 used in 1, 386 used in 2, 100 series used in 3 and 4, 1700 series used in 5 and 6. See ASTM DIS-62aT.

(2) STYRENE-BUTADIENE RX

| Ingredient | 1 | 2 |
|---|---|---|
| Ameropol 1007 | 100 | 100 |
| High abrasion furnace black | 40 | 40 |
| Tetramethyl thiuram disulfide | 3 | |
| Dicumyl peroxide/calcium carbonate | | 5 |
| Tributyltin oxide | 0.02–10 | |

(3) NATURAL RUBBER

| Ingredient | 1 | 2 |
|---|---|---|
| Natural rubber [1] | 100 | 100 |
| Zinc oxide | 5 | 5 |
| Sulfur | 2.5 | 3 |
| Stearic acid | 2.0 | 3 |
| Channel black | | 50 |
| Benzothiazyl disulfide | 1 | 1 |
| Phenyl beta naphthylamine | 1 | |
| Tributyltin oxide | 0.02–10 | 0.02–10 |

[1] NBS Standard Natural Rx 385.

(4) NEOPRENE COMPOUNDS

| Ingredient | Parts | | | | |
|---|---|---|---|---|---|
| | 1 | 2 | 3 | 4 [2] | 5 [3] |
| Neoprene GN | 100 | 100 | | | |
| Neoprene WRT | | | 100 | 100 | 100 |
| Zinc oxide | 5 | 5 | 5 | 5 | 5 |
| Magnesium oxide | 4 | 4 | 4 | 4 | 4 |
| Stearic acid | 0.5 | 1 | | | |
| Channel black | | 20–40 | | | |
| Petroleum wax [1] | | | | 0–5 | 0–2 | 0–2 |
| FEF black | | | 12–20 | | |
| Phenylbetanaphthylamine | | | 2 | 2 | 2 |
| Mercaptobenzylthiazole | | | 1 | 1 | 1 |
| Lauric acid | | | 0–4 | 0–4 | 0–4 |
| Tributyltin oxide | 0.02–12 | 0.02–12 | 0.02–20 | 0.02–8 | 0.02–8 |
| Titanox | | | | 12–30 | 12–30 |
| Pyrazoline red | | | | | 2–5 |

[1] For leach rate control.
[2] White neoprene.
[3] Red neoprene.

(4a) In the foregoing, neoprene compounds, "Bayluscide" may be substituted directly for the tributyltin oxide ingredient in the same proportions.

(5) Butyl rubber

| | Parts |
|---|---|
| Butyl rubber (NBS 388) | 100 |
| Zinc oxide | 5 |
| Sulfur | 2 |
| Stearic acid | 3 |
| Benzothiazyldisulfide | 0.5 |
| Tetramethylthiuram disulfide | 1 |
| Channel black | 50 |
| Tributyltin oxide | 0.02–14 |

(6) Nitrile-butadiene Rx

| Ingredient: | Parts |
|---|---|
| Nitrile-butadiene Rx (bound VCN 18–34%) | 100 |
| Semi-reinforcing furnace black | 30–45 |
| Stearic acid | 1 |
| Mercaptobenzylthiazole | 1 |
| Sulfur | 1–2 |
| Zinc oxide | 5 |
| Tributyltin oxide | 0.02–10 |

(7) POLYESTERURETHANE

| Ingredient | 1 | 2 |
|---|---|---|
| Urethane 5740X1 [1] | 100 | 100 |
| Estane 5701 [1] | | 100 |
| Tributyltin oxide | 0.02–5 | 0.02–5 |

[1] B. F. Goodrich Co. commercial designation.

(8) Solution cast polyesterurethane [1]

| | |
|---|---|
| Estane VC [2] | 100 |
| Solvent | 1000+ |
| Tributyltin oxide | 0.02–4 |

[1] Made in accordance with U.S. Patent 2,831,218.
[2] B. F. Goodrich Co. commercial designation.

In each of the foregoing examples, the numerical quantities for the ingredients specified are in parts per hundred parts of the starting rubber ingredient.

In each of the foregoing recipes, tributyltin oxide (TBTO) may be replaced in the same proportions with tributyltin sulfide, tributyltin fluoride, tributyltin chloride, or tributyltin acetate.

It is to be understood that many of the compounding ingredients in the foregoing recipes may be varied to provide specific physical properties for the rubber in accordance with ordinary rubber compounding skill.

Some of the salient experimental facts we have confirmed in this area are:

(1) Biocidal rubber compositions containing organotin additives effect a 100% kill of mosquito and midge larva at less than *1 part per million* concentration in the infected water of the substance dissolved from the rubber, and their eggs fail to hatch at even lower concentrations;

(2) The compositions of item (1) effect a 100% kill of snail hosts of schistosome cercariae at concentrations of less than *200 parts per billion* of the dissolving substance in the infested water, within 24 hours of the immersion of the composition;

(3) The item (1) compositions effect a 100% kill of schistosome cercariae themselves at concentrations of less than *10 parts per billion* of the dissolving substance in the infested water, within three minutes of the exposure of the cercariae;

(4) Biocidal rubber compositions containing "Bayluscide" additives effect a 100% kill of the host snail of the schistosome cercariae at concentrations of the dissolving toxic in the infested water of less than *1 part per million*, within 24 hours of the immersion of the composition; this effect has continued in flowing water for more than three months without loss of toxic strength;

(5) The item (4) compositions effect a 100% kill of schistosome cercariae at concentrations of less than *10 parts per billion* of the dissolving substance in the infested water.

What is claimed is:

1. In a method for killing water-spawned and water-carried disease-transmitting organisms consisting of the larvae of mosquitos, midges and black flies, schistosome cercariae and their snail hosts, other gastropods, and insect pests, the improvement which comprises dissolving from 0.02 to 20% by weight of a salicylanilide alkanolamine salt or organotin toxicant at least slightly soluble in water to the extent of less than 50 parts by weight per million parts by weight of water in a vulcanizable elastomeric composition miscible with such toxicant and immersing sufficient of the resultant biocidal elastomeric composition in infested water as to maintain over long periods in said water an effective lethal biocidal concentration of said toxicant in said water in the range of from 10 parts by weight of said toxicant per billion to 1 part by weight of said toxicant per million parts by weight of said water and thereby maintain said water free of such disease-transmitting organisms during such period.

2. The method as defined in claim 1 wherein said elastomeric composition is neoprene and said toxicant is selected from the class consisting of the alkanolamine salts of salicyl anilides and the organotin compounds of the formula $R_3SnX$ wherein R is an alkyl or phenyl group and X is a radical selected from the group consisting of sulphide, oxide, chloride, fluoride, bromide, chromate, sulphate, nitrole, hydroxide, acetate, laurate, resinate, dimethyl dithiocarbonate, naphthenate, para-vinyl benzoate, acrylate, methacrylate, isooctylmercaptoacetate, hydride, and methoxide.

3. The method as defined in claim 1 wherein said elastomeric composition is vulcanized neoprene, said toxicant is tributyl tin oxide, said vulcanized elastomeric composition is sub-divided in the form of pellets, and said pellets are broadcast in said infested water.

4. The method as defined in claim 1 wherein said elastomeric composition is vulcanized neoprene, said toxicant is the 2-aminoethanol salt of 2,5-dichloro-4-nitrosalicylanilide, said biocidal elastomeric composition is subdivided in the form of pellets, and said pellets are broadcast in said infested water.

5. The method as defined in claim 1 wherein said elastomeric composition is vulcanized neoprene, said toxicant is the aminoethanol salt of 2,5-dichloro-4-nitrosalicylanilide, said biocidal elastomeric composition is shaped into a tape, and said tape is immersed in said infested water.

References Cited

UNITED STATES PATENTS

| | | | |
|---|---|---|---|
| 2,970,923 | 2/1961 | Sparman | 106—15 |
| 3,079,297 | 2/1963 | Schraufstatter et al. | 167—31 |
| 3,113,067 | 12/1963 | Strufe et al. | 167—30 |
| 3,127,235 | 3/1964 | Benzel | 21—60.5 |
| 3,214,279 | 10/1965 | Scott | 106—15 |
| 3,238,098 | 3/1966 | Howell et al. | 167—46 |
| 3,271,246 | 9/1966 | Howell et al. | 167—46 |
| 3,284,296 | 11/1966 | Freiberg | 167—46 |
| 3,309,267 | 3/1967 | Starkey | 167—30 |

FOREIGN PATENTS

| | | |
|---|---|---|
| 660,947 | 3/1965 | Belgium. |

OTHER REFERENCES

Chem. Abstracts 59(4): 449, set Aug. 19, 1963.
Chem. Abstracts 61(12): 15286g–15287a, Dec. 7, 1964.
Chem. Abstracts 64(12): P17253g, June 6, 1966.

LEWIS GOTTS, *Primary Examiner.*

SHEP K. ROSE, *Assistant Examiner.*

U.S. Cl. X.R.

106—15; 71—67; 424—14, 288